(12) United States Patent
Cabassa (10) Patent No.: US 8,413,824 B2
(45) Date of Patent: Apr. 9, 2013

(54) VERTICALLY-ORIENTED FOLDING WIRE CADDY

(76) Inventor: Albert Louis Cabassa, Morgan Hill, CA (US)

( * ) Notice: Subject to any disclaimer, the term of this patent is extended or adjusted under 35 U.S.C. 154(b) by 0 days.

(21) Appl. No.: 12/897,312

(22) Filed: Oct. 4, 2010

(65) Prior Publication Data

US 2011/0121529 A1 May 26, 2011

Related U.S. Application Data

(60) Provisional application No. 61/263,634, filed on Nov. 23, 2009.

(51) Int. Cl.
*A47F 7/00* (2006.01)

(52) U.S. Cl.
USPC .................. 211/85.5; 211/85.15; 211/195

(58) Field of Classification Search .......... 211/85.5, 211/23, 24, 182, 189, 195, 168, 44, 41.4, 211/41.5, 85.31, 198, 12, 85.15, 196, 197, 211/204, 5.5; 248/460, 240, 204.1, 165, 248/463, 464, 163.1, 155.4; 242/590, 594.4, 242/596.1, 596.3, 596.4, 403, 403.1, 557, 242/577, 577.3, 594, 594.5, 594.6, 139, 398, 242/399, 401, 588, 597, 597.5, 597.7, 597.8, 242/130.2, 130.3
See application file for complete search history.

(56) References Cited

U.S. PATENT DOCUMENTS

| | | | | | |
|---|---|---|---|---|---|
| 240,807 A | * | 5/1881 | Beneke | | 211/170 |
| 661,036 A | * | 11/1900 | Clark | | 248/165 |
| 732,037 A | * | 6/1903 | Best | | 211/195 |
| 929,790 A | * | 8/1909 | Ruesing | | 242/597.5 |
| 1,393,054 A | * | 10/1921 | Turner | | 211/60.1 |
| 1,764,072 A | * | 6/1930 | Frazer et al. | | 211/196 |
| 2,353,374 A | * | 7/1944 | Thompson | | 211/170 |
| 2,503,545 A | * | 4/1950 | Cook | | 242/141 |
| 3,452,947 A | * | 7/1969 | Thurman | | 242/131 |
| 3,483,999 A | * | 12/1969 | Barrett | | 211/204 |
| 3,525,492 A | * | 8/1970 | Kaufman et al. | | 248/188.6 |
| 3,570,731 A | * | 3/1971 | Waltz | | 225/38 |
| 4,049,140 A | * | 9/1977 | Roose | | 414/24.6 |
| 4,137,939 A | * | 2/1979 | Chow | | 137/355.27 |
| 4,172,608 A | * | 10/1979 | Brown, Jr. | | 242/588 |
| 4,456,197 A | * | 6/1984 | Canetta | | 242/130.4 |
| 4,564,325 A | * | 1/1986 | Ackerman | | 414/24.5 |

(Continued)

*Primary Examiner* — Jennifer E Novosad
*Assistant Examiner* — Hiwot Tefera
(74) *Attorney, Agent, or Firm* — Donald R. Boys; Central Coast Patent Agency, Inc.

(57) ABSTRACT

A folding wire caddy has a horizontal base member, a leg support member pivotally attached with a vertical axis at a point along the horizontal base member near a first end, such that the leg member may be folded to be parallel and adjacent to the base member, or to be at a right angle to the base member, a second leg support member pivotally attached with a vertical axis at a point along the horizontal base member near an end of the base member opposite the first end of the base member, such that the second leg member may be folded to be parallel and adjacent to the base member, or to be at a right angle to the base member, and one or more spindle members pivotally attached near one end of each spindle member with horizontal axes at points along the first length of the base member, such that each spindle member my fold to be parallel and adjacent to the base member, or at a right angle to the base member, extending vertically.

5 Claims, 6 Drawing Sheets

U.S. PATENT DOCUMENTS

| | | | | |
|---|---|---|---|---|
| 4,667,896 A | * | 5/1987 | Frey et al. | 242/118.41 |
| 4,958,784 A | * | 9/1990 | Totten | 242/129.6 |
| 5,074,734 A | * | 12/1991 | Price et al. | 414/24.6 |
| 5,170,938 A | * | 12/1992 | Dewing | 239/52 |
| 5,285,981 A | * | 2/1994 | Pavelka | 242/557 |
| 5,617,962 A | * | 4/1997 | Chen | 211/206 |
| 5,655,622 A | * | 8/1997 | Pavlu | 182/129 |
| 5,884,826 A | * | 3/1999 | Shaver | 224/509 |
| 6,079,572 A | * | 6/2000 | Irvin | 211/23 |
| 6,086,013 A | * | 7/2000 | Looney et al. | 242/594.4 |
| 6,145,674 A | * | 11/2000 | Spearman et al. | 211/59.1 |
| 6,182,920 B1 | * | 2/2001 | Watkins | 242/594.4 |
| 6,199,786 B1 | * | 3/2001 | Lessard et al. | 242/406 |
| 6,422,504 B1 | * | 7/2002 | Elder | 242/594.6 |
| 6,523,776 B1 | * | 2/2003 | Elder | 242/594.4 |
| 7,641,251 B1 | * | 1/2010 | Stepanians | 296/3 |
| 7,810,574 B2 | * | 10/2010 | Stukey et al. | 166/384 |
| 7,992,819 B2 | * | 8/2011 | King | 242/571.4 |
| 2002/0074447 A1 | * | 6/2002 | Schneider | 242/566 |
| 2005/0116083 A1 | * | 6/2005 | Bayer et al. | 242/597.7 |
| 2006/0065615 A1 | * | 3/2006 | Wang | 211/206 |
| 2006/0086862 A1 | * | 4/2006 | Konkel et al. | 242/594.5 |
| 2007/0120003 A1 | * | 5/2007 | Grant | 242/557 |
| 2007/0221598 A1 | * | 9/2007 | Sabounjian | 211/200 |
| 2011/0108658 A1 | * | 5/2011 | Factor | 242/594 |
| 2011/0309215 A1 | * | 12/2011 | Lu et al. | 248/165 |

* cited by examiner

VERTICALLY-ORIENTED FOLDING WIRE CADDY

CROSS-REFERENCE TO RELATED DOCUMENTS

The present invention is a Non-Provisional application of U.S. Provisional application 61/263,634, filed on Nov. 23, 2009. The disclosure of priority application is incorporated herein at least by reference.

BACKGROUND OF THE INVENTION

1. Field of the Invention

The present invention pertains to the field of electrical support equipment particular to electricians, and more specifically to equipment for the storage and dispensing of wire and cable from spools.

2. Description of Related Art

Electrical wire and cable conduit for construction and renovation purposes is typically provided on spools of various diameter, height and wire gauge. Depending on a number of factors, electrician's access wire from spools to create wire bundles that may feed into a protective sheath, commonly known as conduit, for new construction and renovation projects. A variety of electrical wire storage and dispensing apparatus are available commercially, where typically horizontal shafts or spindles are provided and form a rack system, wherein wire spools are then attached.

The above mentioned method presents a number of problems for electricians. One such problem is loading wire or cable spools onto the horizontal spindles or rods, particularly those of hand-cart-style wire caddies. Considerable strength is often required, due to compounded loading, as additional reels are added to a bar or spindle rack system. Furthermore, there is little friction between the arbor of the spool and the rod or spindle. That being the case, when pulling wire aggressively from a spool excessive unrolling of wire, from freewheeling, is often experienced. A jumble of wire at the bottom of the caddy is often the result, intertwined with the wire of neighboring spools.

What is clearly needed in the art is a wire spool caddy that allows easy loading, does not overrun or tangle and exhibits a unique collapsible design for storage and transport in a minimal amount of space.

BRIEF SUMMARY OF THE INVENTION

A problem described in the Background section above is that wire spools supported on horizontal spindles do not provide sufficient friction to stop the spools turning when a worker stops pulling wire from a spool, resulting in overruns and tangled wire. The inventor realized that vertical orientation of the spindles might certainly be preferable, and that a system foldable to allow easy transport and storage would be desirable. As a result:

A folding wire caddy is provided, comprising a horizontal base member of a first length, a first leg support member of a second length pivotally attached with a vertical axis at a point along the second length to the horizontal base member near a first end of the base member, such that the leg member may be folded to be parallel and adjacent to the base member, or to be at a right angle to the base member, a second leg support member of a third length pivotally attached with a vertical axis at a point along the third length to the horizontal base member near an end of the base member opposite the first end of the base member, such that the second leg member may be folded to be parallel and adjacent to the base member, or to be at a right angle to the base member, and one or more spindle members pivotally attached near one end of each spindle member with horizontal axes at points along the first length of the base member, such that each spindle member my fold to be parallel and adjacent to the base member, or at a right angle to the base member, extending vertically.

In one embodiment the base member, the leg members and the spindle members comprise lengths of tubing. Also in one embodiment the leg members, at a right angle to the base member, form a stable support base for the folding wire caddy, and the spindle members are of a common length, such that, oriented vertically, spools of wire may be placed thereon with the axes of the spools oriented vertically.

In one embodiment the spindle members are attached to the base member alternating on opposite sides of the base member. There may also be resilient foot members joined to ends of the leg members, providing resilient contact to a supporting surface. There may also be end caps fitted to ends of the base member and the spindle members to seal the tubes from water and debris.

In a further embodiment a folding wire caddy is provided, further comprising a support tray for supporting large coils of material, the tray having a circular and planar base having a center hole to slide over one vertical spindle of the wire caddy, the base of a diameter sufficient to support a coil of material of equal or smaller outside diameter, the coil having an inside diameter, and a center hub structure having an outside diameter somewhat smaller than the inside diameter of the coil, and an inside diameter just larger than diameter of a spindle, such that the planar base and the center hub structure may be placed over a spindle of the wire caddy to support a coil of material with the axis of the coil vertical. In one embodiment the center hub structure is collapsible to be adjacent to and coplanar with the planar base.

In another aspect of the invention a wire caddy cart is provided, comprising a substantially rectangular cart base having a first length and a width, and wheels near four corners of the base, the base presenting a planar upper surface with the cart supported on the wheels, at least one base member of a second length joined to the planar upper surface, and one or more spindle members pivotally attached near one end of each spindle member with horizontal axes at points along the length of the base member, such that each spindle member my fold to be parallel and adjacent to the base member, or at a right angle to the base member, extending vertically. The base member and the spindle members may comprise lengths of tubing.

In one embodiment the spindle members are of a common length, such that, oriented vertically, spools of wire may be placed thereon with the axes of the spools oriented vertically. Also in one embodiment the spindle members are attached to the base member alternating on opposite sides of the base member.

In one aspect the wire caddy cart further comprises a support tray for supporting large coils of material, the tray having a circular and planar base having a center hole to slide over one vertical spindle of the wire caddy, the base of a diameter sufficient to support a coil of material of equal or smaller outside diameter, the coil having an inside diameter, and a center hub structure having an outside diameter somewhat smaller than the inside diameter of the coil, and an inside diameter just larger than diameter of a spindle, such that the planar base and the center hub structure may be placed over a spindle of the wire caddy to support a coil of material with the axis of the coil vertical.

The center hub structure may be collapsible to be adjacent to and coplanar with the planar base. Also there may be a carrying shelf attached to an underside of the cart base, sized to carry the support tray with the center hub collapsed.

DETAILED DESCRIPTION OF THE INVENTION

Figure 1:
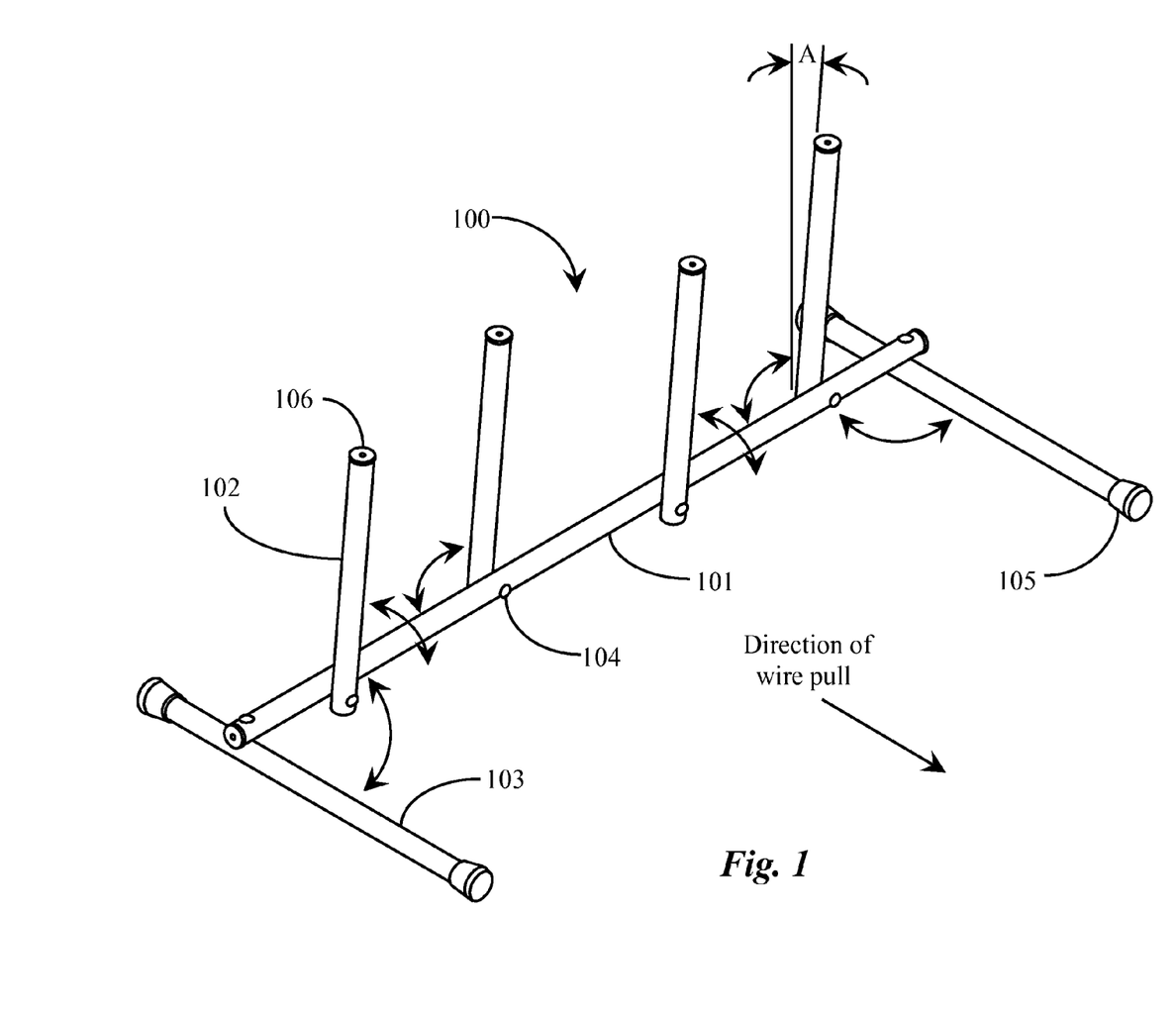
FIG. 1 is an isometric view of a vertically-oriented folding wire caddy according to one embodiment of the present invention, shown in unfolded (deployed) mode.

FIG. 1 is an isometric view of a vertically-oriented wire caddy 100 according to one embodiment of the present invention. The wire caddy illustrated in FIG. 1 comprises a longitudinal support base 101, whereby vertical spindles 102 are attached, allowing spools of wire (further illustrated in FIG. 3) to be placed. The vertically-oriented spindles are advantageous for reducing free-wheeling of the spools when wire is aggressively pulled. This is achieved primarily by spool weight and friction against support base (tube) 101.

As relates generally to materials, it will be evident to one skilled in the art that the present invention may be produced from a variety of materials, although aluminum or light weight steel tubing might be preferred. The longitudinal support, acting as a base, should be of sufficient outside diameter (O.D.) and wall thickness to provide robust resistance to bending. Tubing should also be sized to allow for standard wire spool arbor diameters, or optionally adapter sleeves (not shown).

Figure 2:
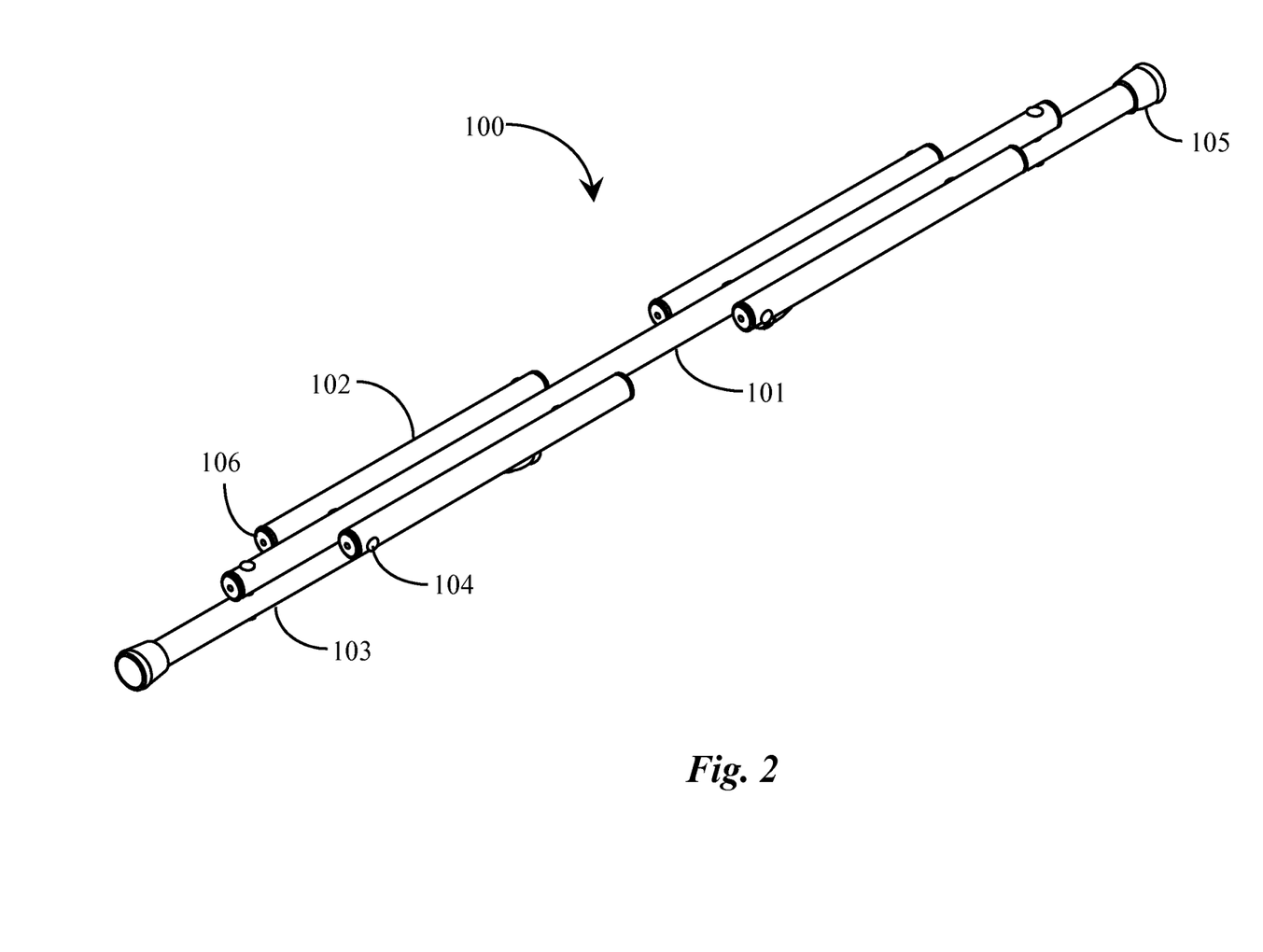
FIG. 2 is an isometric view of the wire caddy of FIG. 1 shown in a collapsed condition.

In FIG. 1, a plurality of vertical spindles are equally spaced, but may be randomly spaced to allow for unique spool requirements. It should be noted that by varying the number of vertical spindles by rotating adjacent spindles downward, large and small spool diameter configurations can be achieved. Vertical spindles are attached to the support tube in this example by way of a fixed fastener 104 which passes through clearance holes in both spindle and support tube, creating a rotational link. This may be accomplished in a variety of ways such as, riveting methods, threaded fasteners or any other method of fastening which allows rotation along the axis of the support tube. The spindles are mounted in a staggered fashion, adjacent to and on opposite sides of the longitudinal support in this example. By doing so, spindles 102 may be folded down and nestled alongside the base without interference to each other (as illustrated in FIG. 2). The distance between adjacent axes for spindle members being greater than the common length of the spindle members.

The longitudinal support base and spindles are supported by folding legs 103. The legs are made from like material as noted above and may be attached in like manner as the spindles, but on opposite ends of the support tube and through clearance holes in both leg and support tube. The through holes for the legs are normal to the axis of vertical spindles 102, allowing them to fold beneath the structure, planar to longitudinal support tube (as illustrated in FIG. 2). It should be noted that legs 103 are attached to the longitudinal support with on offset. The greater portion of the length of each leg is forward of the longitudinal support when unfolded, providing the best support for the direction of pulling wire from the spools. To provide additional stability to the structure, an angular dimension (A) may be achieved by rotating the normally perpendicular orientation of the structure to the legs to one that is angular to the direction of wire pull force.

To prevent the wire caddy from sliding on ground or other support surfaces while deploying wire, rubber end stoppers 105 are utilized in this example. Tube end inserts 106 may also be placed onto open ends of tubing elements to prevent dirt, moisture or debris build-up.

FIG. 2 is an isometric view of the vertically-oriented wire caddy of FIG. 1 shown in a collapsed state. By folding the vertical spindles and support leg elements into a condensed footprint, storage and transport are greatly enhanced. In this folded state the caddy may be stored, for example, in a tubular carrier of sufficient diameter, or a carrying bag.

Figure 3:
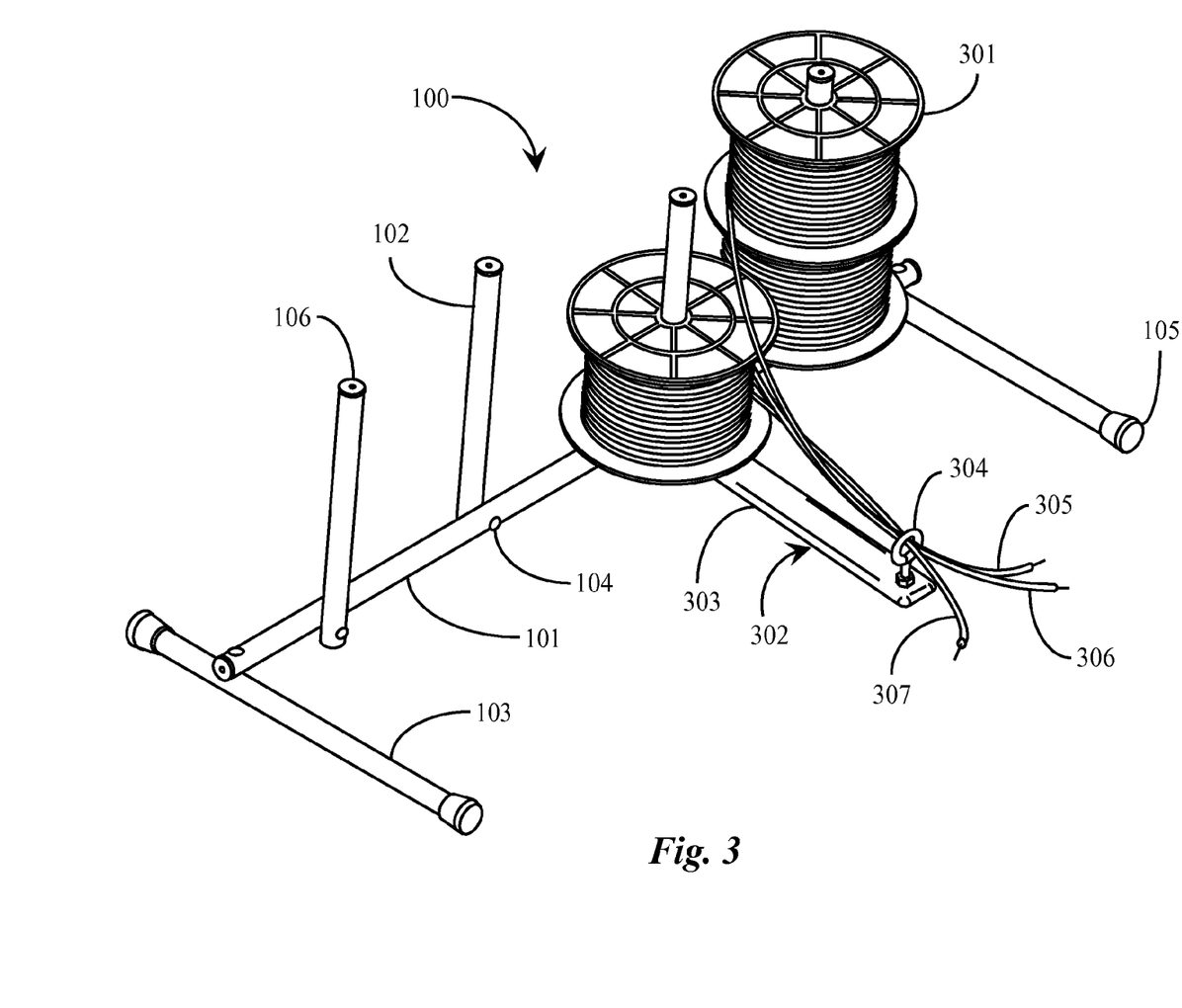
FIG. 3 is an isometric view of the wire caddy of FIG. 1 shown unfolded and loaded with wire spools as it may be used in the field, according to one embodiment of the present invention.

FIG. 3 is an isometric view of the vertically-oriented wire caddy of FIG. 1 shown as it might be used in the field. The caddy is illustrated in an unfolded state, with wire spools 301 loaded onto vertical spindles and a wire guide accessory 302 according to one embodiment of the present invention. The guide accessory comprises a formed flat bar element 303 having a clearance hole on one end sized for sliding over vertical spindles 102. The bar may be formed into a thicker cross-section by rolling over the edges to increase its cross-section, resulting in a stiffer component. It could be of light weight aluminum or sheet metal. The wire guide may also have a commercial eye bolt 304 attached to the end away from the base, as shown. A threaded fastener atop and bottom of the flat bar will lock the eye bolt into place, alternatively it may also be welded into place. There are a number ways to manufacture the wire guide well known to a sheet-metal artisan. For instance, a portion of the flat bar may be bent perpendicular for some length, having a pre-punched and roll formed hole that prevents the chaffing of wire passed through it.

A primary function for wire guide accessory 302 is a method for easy removal of wire from mounted spools and grouping them into a wire runs. FIG. 3 illustrates one example of field use wherein a common wire 305, neutral wire 306 and a ground wire 307 are pulled from the wire caddy, through the guide forming a common household or commercial circuit run of 12-3 wiring (for example). The wire guide may be tethered to the wire caddy with a wire lanyard (not shown), having sufficient length and being centrally mounted to allow relocation to any vertical spindle, preventing its loss from the caddy.

Figures 4, 5:
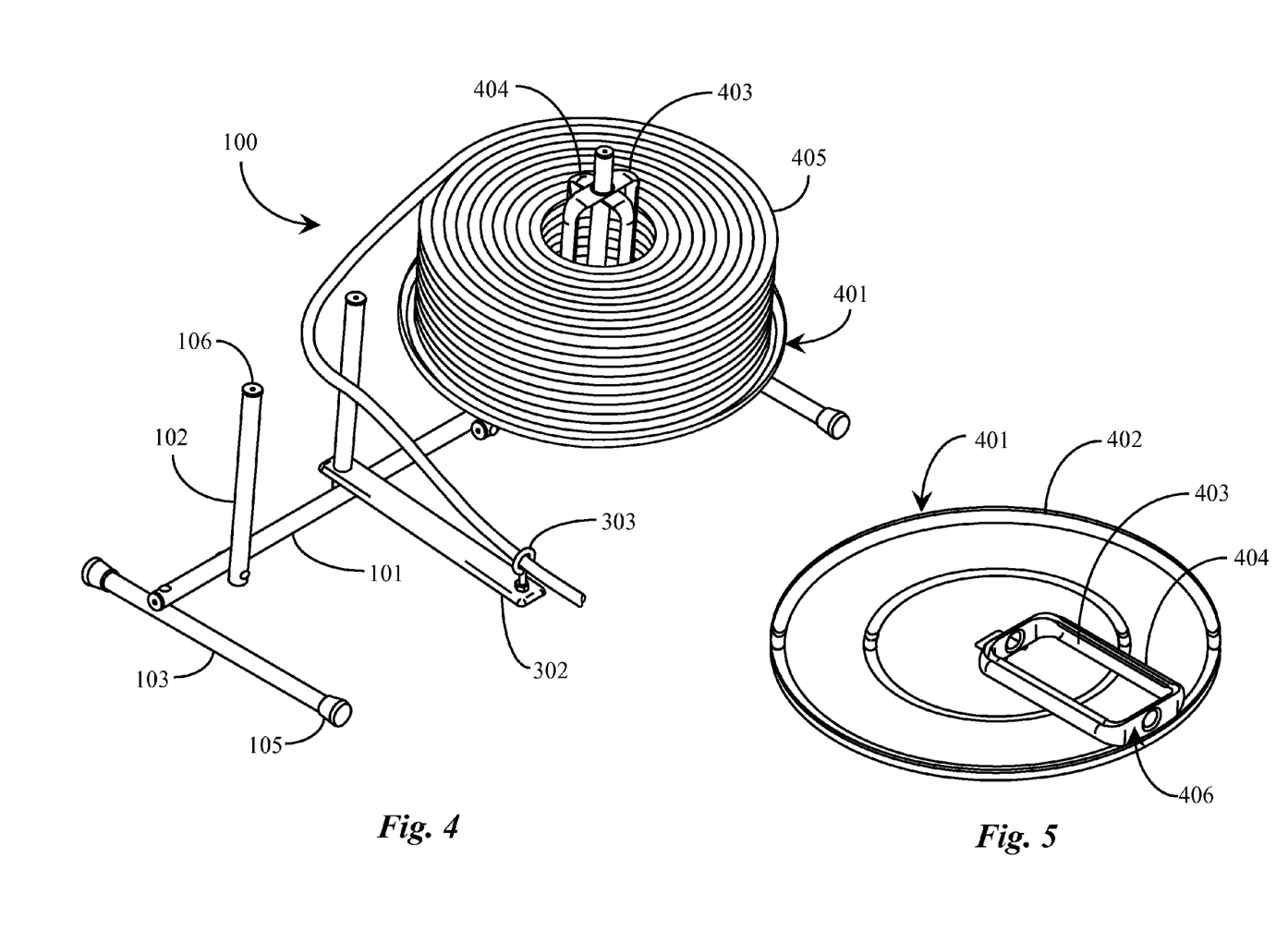
FIG. 4 is an isometric view of the wire caddy of FIG. 3 shown with a collapsible conduit spool, containing conduit (for illustrative purposes only), according to another embodiment of the present invention.
FIG. 5 is an isometric view of the conduit reel illustrated in FIG. 4 shown without a spool and in a collapsed condition.

FIG. 4, in conjunction with FIG. 5, is an isometric view of the wire caddy of FIG. 3 illustrating another use of the wire caddy in deploying materials common to a field electrician. In this example, the caddy is loaded with conduit 405, well known to the electrician in the art. This material may also be heavy wire, romex, or any other material that is commonly provided on spools lager in diameter than those shown, for example, in FIG. 3. It should be noted that wire spools may also be present on the caddy, but are not illustrated in this example. A conduit tray accessory 401 (see also FIG. 5) is used to deploy conduit, efficiently and without over-run, in a like manner as described above for wire spools. The tray comprises a circular base 402 of aluminum or sheet steel having a rolled or welded lip in this example running along its perimeter that aids in retaining the conduit in a loosely-packed coil. The example shown in FIG. 4 has two semi-circular concave stamped ribs formed into a single sheet metal disc, which provide rigidity to the component. The ribs ride atop the longitudinal support and a folded vertical spindle of the wire caddy.

The coiled conduit is retained to tray base 402 with a collapsible center hub 406. The hub comprises a rectangular inner spoke 403 nested within an outer rectangular spoke 404. The two elements are retained to each other by roll forming a smaller diameter hole of the outer spoke into a clearance diameter hole of the inner spoke from both ends. This creates a interior lip, locking the two pieces together and providing a surface in which the halves may be swiveled. It should be noted that while forming the hub's through hole, it should be sized to freely slip over the O.D. of vertical spindle 102.

The conduit tray may also have a square or circular punched area, centered to the OD of the tray, for clearance with the vertical spindle. The punch-out may leave material which can be used to roll a hinge pin receiver, forming one half of the hinge (not shown) that is used to attach hub 406 to tray 402. The other half of the hinge (not shown) may be riveted or welded to the base of the hub. A hinge pin (not shown), inserted through both halves of the hinge completes the attachment and allows the center hub to fold down, in one embodiment of the present invention. Also, the hinge should protrude to the underside of the tray, but also small enough to not protrude beyond the ribs formed into the tray base.

It will be evident to one skilled in the art that the present embodiment described above may be used for a variety of large cable, sheathing materials or conduit sizes.

Figure 6:
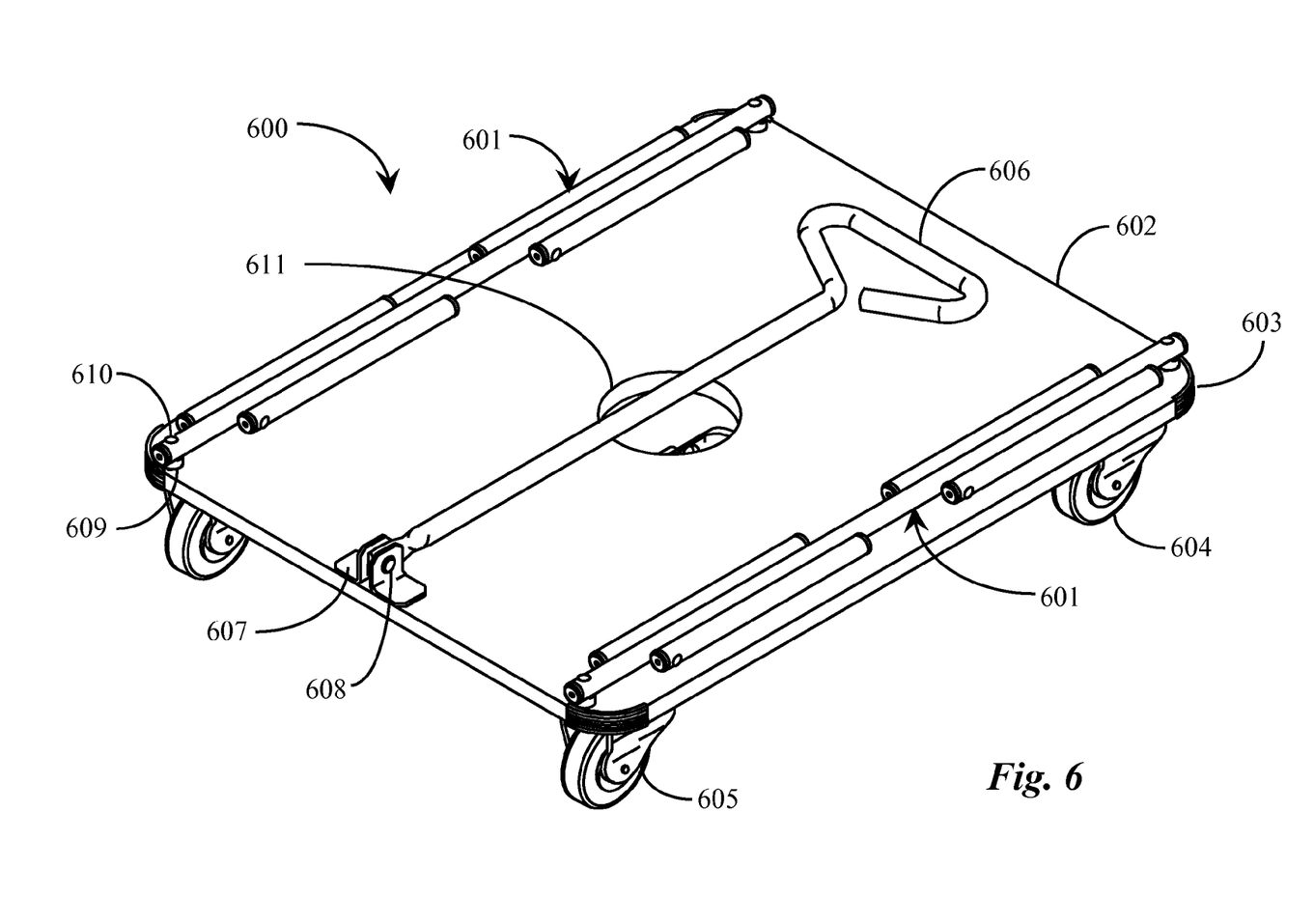
FIG. 6 is an isometric view of a vertically-oriented folding wire caddy cart according to another embodiment of the present invention.

FIG. 6 is an isometric view of a vertically-oriented wire caddy cart 600 whereby two separate wire caddies 601, similar to that described above, with the exclusion of support legs 103, are mounted to a cart base 602 allowing for greater capacity of mounted wire spools, according to other embodiments of the present invention.

Cart base 602 is of plywood construction having a general rectangular shape to accommodate the length requirement for wire caddies 601. It should have a width span sufficient to provide a stable stance while fully loaded with wire spools. To prevent knocking off sharp corners of the base or damaging walls and door jambs, rounded edges are incorporated with aluminum or plastic molded bumpers 603 to each corner. A hole 611 is centrally located into the cart base providing a hand-hold while transporting the cart in the collapsed state. The base is mobilized with the use of fixed casters 604 at the rear of the base and swivel casters 605 to the front of the base. To enhance directional mobility, swivel casters may be used at the rear of the cart as well. The casters may be attached to the underside of the cart base using a variety of fasteners, well known to a skilled artisan.

To pull the wire caddy cart from location to location, a handle 606 is utilized and performs much in the manner as the handle of a child's wagon. The handle may be attached to the base with a left-hand L-shaped bracket 607 and a right-hand L-shaped bracket 608 which may be fastened to the cart base in a number of ways.

Wire caddies 601 in this example are mounted to outer edges of the base, at opposite ends of each structure, with threaded fasteners 610 that pass through longitudinal support tubes and cylindrical spacers 609 which space the wire caddy structures away from cart base top. In doing so, vertical spindles may freely rotate from a folded position to an upright position with interference.

Figure 7:
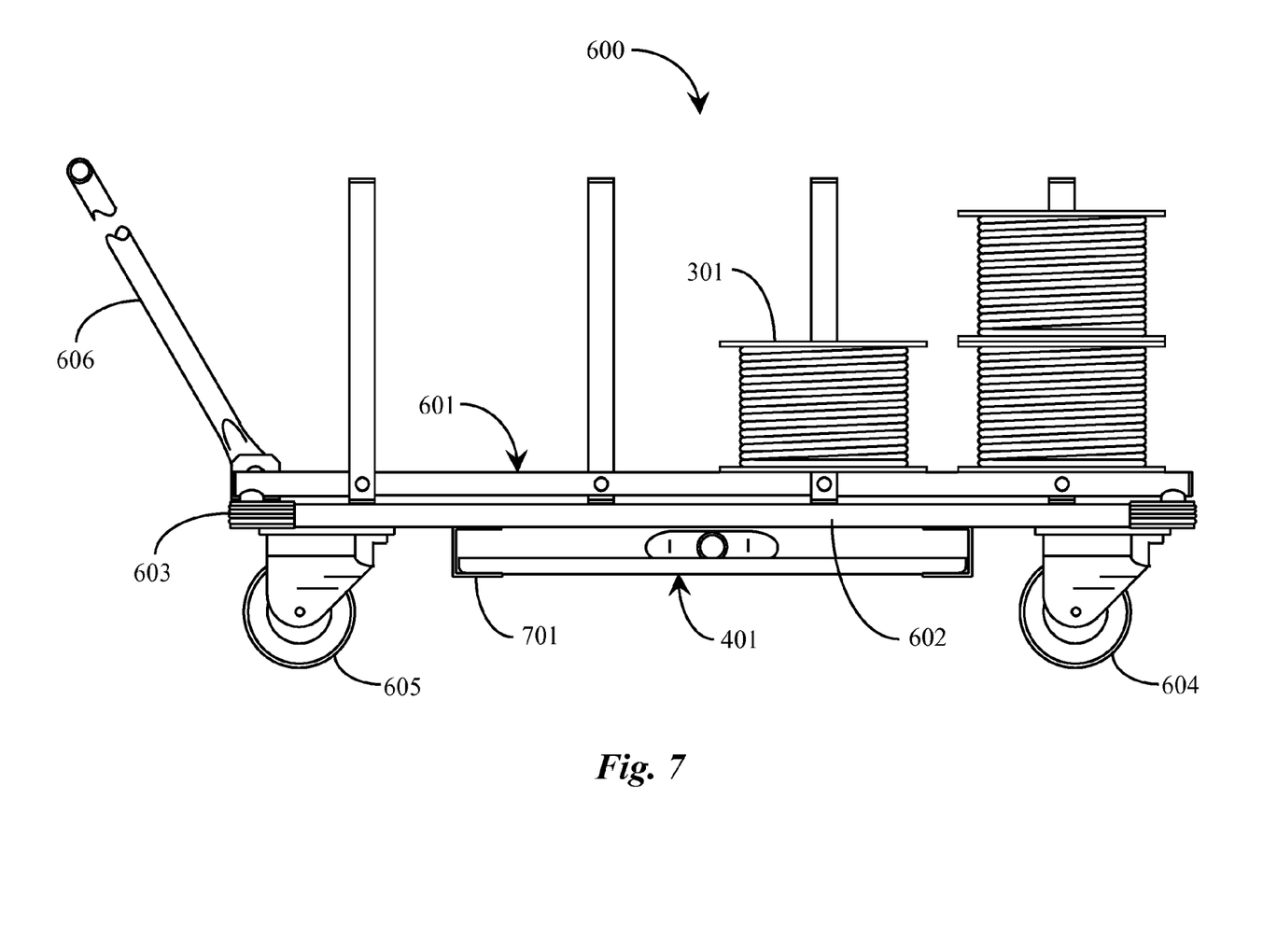
FIG. 7 is a side elevation view of the wire caddy cart of FIG. 6 showing an under-carriage storage of the collapsed conduit reel of FIG. 5, the wire caddy spindles in the vertical position and wire spools loaded.

FIG. 7 is a side elevation view of the wire caddy cart of FIG. 6 showing wire spool spindles in an upright position and several wire spools (for illustrative purposes only) loaded to the cart. FIG. 7 also illustrates an under-carriage storage location for conduit tray accessory 401 according to another embodiment of the present invention. U-shaped brackets 701 are attached to the under-side of cart base 602 forming an open shelf whereby the conduit tray may be slid onto. The tray accessory may be retained in position with a retaining pin (not shown) that passes through the underside of bracket 701 and into the conduit tray.

It should be noted that wire guide accessory 302 may also be retained to the cart by means similar to that described previously for attachment to the wire caddy illustrated with reference to FIG. 3, or may alternatively be attached to cart base with a pin and slot configuration.

It will be evident to the skilled artisan the advantages of the vertical orientation of wire spool spindles, the low center of gravity and collapsible configuration of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention, and the breadth is limited only by the claims that follow.

The invention claimed is:

1. A folding wire caddy, comprising:
a horizontal tubular base member of a first length;
a first tubular support member of a second length pivotally attached at a point along the second length to the horizontal base member near a first end of the base member, and below the horizontal base member, such that the first support member is enabled to be rotated in a horizontal plane such that it is parallel to and adjacent to the horizontal base member, or rotated to be orthogonal to the horizontal base member with a substantial portion of the first support member extending to each side away from and below the horizontal base member;
a second tubular support member of a third length pivotally attached at a point along the third length to the horizontal base member near a second end of the horizontal base member opposite the first end of the horizontal base member, and below the horizontal base member, such that the second tubular support member is enabled to be rotated such that it is parallel and adjacent to the horizontal base member, or rotated to be orthogonal to the horizontal base member with a substantial portion of the second support member extending to each side away from the horizontal base member; and
four or more spindle members of common length, each having a first and a second end, pivotally attached near the first end of each spindle member to the base member at pivot points along the first length of the base member and alternatively on opposite sides of the base member, the axes of rotation of the spindle members being horizontal, and equally spaced along the base member, the distance between adjacent axes for spindle members being greater than the common length of the spindle members, such that each spindle member is enabled to be rotated such that it is parallel and adjacent to the base member, or orthogonal to the base member and extended vertically, such that the support members rotated to be orthogonal to the base member, support the base member horizontally, such that when the spindle members are rotated to be orthogonal to the base member, the spindle members extend vertically, such that a spool of wire placed on one of the spindle members over the second end of the spindle member will rest upon the base member.

2. The folding wire caddy of claim 1 further comprising resilient foot members joined to ends of the support members, providing resilient contact to a supporting surface.

3. The folding wire caddy of claim 1 further comprising end caps fitted to ends of the base member and the spindle members to seal the tubes from water and debris.

4. The folding wire caddy of claim 1 further comprising a support tray for supporting large coils of material, the tray comprising:
   a circular and planar base having a center hole to slide over one vertical spindle of the wire caddy, the base of a diameter sufficient to support a coil of material of equal or smaller outside diameter, the coil having an inside diameter; and
   a center hub structure having an outside diameter somewhat smaller than the inside diameter of the coil, and an inside diameter just larger than diameter of a spindle, such that the planar base and the center hub structure may be placed over a spindle of the wire caddy to support a coil of material with the axis of the coil vertical.

5. The folding wire caddy of claim 4 wherein the center hub structure is collapsible to be adjacent to and coplanar with the planar base.

\* \* \* \* \*